United States Patent [19]

Yoshioka

[11] Patent Number: 4,512,592
[45] Date of Patent: Apr. 23, 1985

[54] FRONT FORK REINFORCING STRUCTURE IN MOTOR BICYCLE OR THE LIKE

[75] Inventor: Toshiharu Yoshioka, Saitama, Japan

[73] Assignee: Honda Giken Kogyo Kabushiki Kaisha, Japan

[21] Appl. No.: 418,961

[22] Filed: Sep. 16, 1982

[30] Foreign Application Priority Data

Sep. 17, 1981 [JP] Japan .............................. 56-137177[U]

[51] Int. Cl.³ .............................................. B62K 19/24
[52] U.S. Cl. ...................................... 280/279; 280/277
[58] Field of Search ............... 280/279, 274, 275, 276, 280/277, 280, 281 R, 283, 287

[56] References Cited

U.S. PATENT DOCUMENTS

| 1,509,177 | 9/1924 | Rasmussen | 280/287 |
| 1,834,308 | 12/1931 | Harley | 280/276 |
| 2,768,836 | 10/1956 | Hilber | 280/276 |

FOREIGN PATENT DOCUMENTS

| 63770 | 4/1955 | France | 280/276 |
| 2447313 | 9/1980 | France | 280/281 R |

Primary Examiner—Joseph F. Peters, Jr.
Assistant Examiner—Mitchell J. Hill
Attorney, Agent, or Firm—Sughrue, Mion, Zinn, Macpeak, and Seas

[57] ABSTRACT

The mechanical strength and torsional rigidity of the front forks of a motorcycle are improved by a connector rigidly joining brackets attached to the lower casings.

2 Claims, 2 Drawing Figures

U.S. Patent  Apr. 23, 1985  4,512,592
FIG. 1
FIG. 2
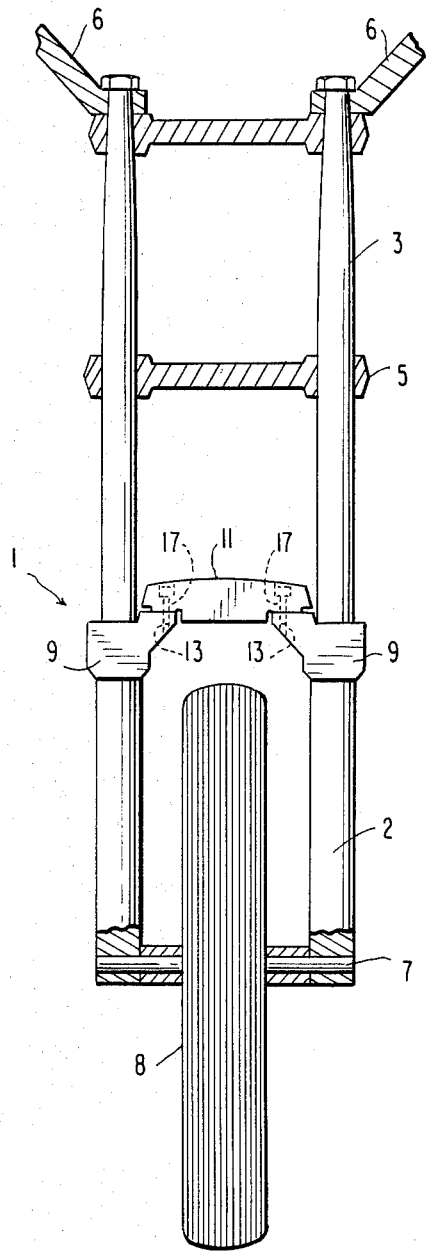
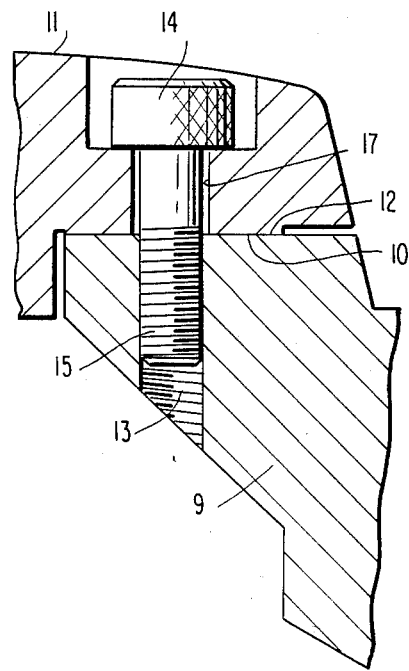

FRONT FORK REINFORCING STRUCTURE IN MOTOR BICYCLE OR THE LIKE

BACKGROUND OF THE INVENTION

This invention relates to a structure for reinforcing the telescopic front forks of a motorcycle or the like.

A motorcycle has a pair of telescopic front forks which suffer from a number of problems. The first problem is that the front forks are not completely sufficient in mechanical strength and rigidity. The second problem is that it is rather difficult to assemble and disassemble the front fork.

SUMMARY OF THE INVENTION

Accordingly, an object of this invention is to eliminate the above-described difficulties accompanying the conventional telescopic front forks of a motorcycle or the like.

More specifically, an object of the invention is to provide a front fork reinforcing structure for a motorcycle or the like which can improve the mechanical strength and rigidity of the pair of telescopic front forks thereof and which facilitates assembly and disassembly of the front forks.

The foregoing and other objects as well as the characteristic features of the invention will become more apparent from the following detailed description when read in conjunction with the accompanying drawings.

BRIEF DESCRIPTION OF THE DRAWINGS

In the accompanying drawings:

FIG. 1 is a front view, partly as a sectional view, of one example of a front fork reinforcing structure according to this invention; and FIG. 2 is an enlarged sectional view of the essential components of the front fork reinforcing structure of FIG. 1.

DETAILED DESCRIPTION OF THE PREFERRED EMBODIMENTS

One embodiment of this invention will now be described with reference to the accompanying drawings.

In FIG. 1 reference numeral 1 designates a pair of telescopic front forks each comprising a bottom case 2 and a fork pipe 3 which is axially slidably inserted into the bottom case 2. The fork pipes 2 are coupled to each other through a top bridge member 4. The fork pipes 2 are further coupled to each other through a bottom bridge member 5 provided below the top bridge member 4. A handle shaft (not shown) is fixedly secured to the midpoints of the bridge members 4 and 5 and is pivotally mounted on a head pipe (not shown). Handles 6 are fixedly secured to the upper end portions of the fork pipes 3, respectively, in such a manner that the handles 6 are in contact with the top bridge member 4.

Both end portions of a front wheel axle 7 are fixedly secured to the lower end portions of the bottom cases 2.

A front wheel 8 is rotatably mounted on the front wheel axle 7.

Brackets 9 extend from the upper end portions of the bottom cases 2, respectively, in such a manner that the brackets extend towards each other as shown in FIG. 1. A connecting member 11 is formed so that the lower surfaces 12 of both end portions of the connecting member 11 are in close contact with the upper surfaces 10 of the brackets 9, respectively, when the connecting member 11 is secured to the brackets 9 with bolts 14. Each bracket has two female-threaded holes 13 as shown in FIG. 2, and each of the two end portions of the connecting member 11 has two through-holes 17. Accordingly, the connection member 11 can be detachably secured to the brackets at either end with the male-threaded portions 15 of the bolts 14 engaging the female-threaded holes 13 through the through-holes in the connecting member 11.

As is apparent from the above description, the pair of fork pipes 3 are coupled to each other through the top and bottom bridge members 4 and 5, and the brackets 9 extending from the upper end portions of the pair of bottom cases 2 are coupled to each other through the connecting member 11. Accordingly, the pair of telescopic front forks 1 are improved in mechanical strength and rigidity, and the handle shaft (not shown) and components related thereto are improved in torsional rigidity.

In the above-described embodiment, the connecting member 11 is tightened to the brackets 9 of the bottom cases 2 from above with the bolts 14. Therefore, the front forks 1 are maintained symmetrical.

As the connecting member 11 and the brackets 9 of the bottom cases 2 are made into one unit by the use of the bolts, assembly or disassembly of the front forks 1 can be readily achieved.

What is claimed is:

1. A front fork reinforcing structure for a motorcycle or the like, comprising:
   a pair of telescopic forks each having a bottom case axially slidably engaged to a respective one of a pair of upper fork pipes;
   means for rigidly connection said pair of fork pipes to each other at the upper portions thereof;
   a pair of brackets, each extending radially outwardly from upper end portions of a respective one of said bottom cases and rigidly attached to said respective case; and
   a connecting member having through-holes at either end thereof; and
   bolt means threadingly engageable through said through-holes with said brackets for fixedly and replaceably securing said connecting member to both said brackets.

2. A structure as claimed in claim 1, said brackets extending toward one another and being bridged by said connecting member.

* * * * *